United States Patent [19]

Akiyama et al.

[11] Patent Number: 5,530,831
[45] Date of Patent: Jun. 25, 1996

[54] INTERCHANGEABLE EXTENSION BOARD DISK ARRAY SYSTEM

[75] Inventors: Hitoshi Akiyama; Naoto Matsunami; Yasunori Kaneda; Takashi Oeda, all of Yokohama, Japan

[73] Assignee: Hitachi, Ltd., Japan

[21] Appl. No.: 279,392

[22] Filed: Jul. 25, 1994

[30] Foreign Application Priority Data

Aug. 2, 1993 [JP] Japan .................................. 5-191267

[51] Int. Cl.⁶ .................................................. G06F 11/00
[52] U.S. Cl. ........................ 395/441; 395/404; 395/284; 395/281
[58] Field of Search .......................... 395/441, 281–285, 395/404

[56] References Cited

U.S. PATENT DOCUMENTS

| 4,870,643 | 9/1989 | Bultman et al. | 371/11.1 |
| 5,148,432 | 9/1992 | Gordon et al. | 371/10.1 |

FOREIGN PATENT DOCUMENTS

| 1-250128 | 10/1989 | Japan . |
| 2-236714 | 9/1990 | Japan . |

Primary Examiner—Jack B. Harvey
Assistant Examiner—Sumati Lefkowitz
Attorney, Agent, or Firm—Evenson, McKeown, Edwards & Lenahan

[57] ABSTRACT

A disk array system in which the disk array control mode can be switched to a higher-performance mode easily by exchanging extension boards. An IF board is parallel-connected to disk devices through signal lines. Several types of extension boards each having a controller in accordance with the access control mode are prepared so that one of the extension boards is connected to the IF board through a connector formed as a set of one internal bus connector, a plurality of SCSI connectors and extension board type identification pins. As a result, it is not necessary for a user to alter the connection of disk drives and to switch control software on the host computer, so that the disk array control mode can be changed to a higher-performance mode easily only by exchanging the board.

8 Claims, 7 Drawing Sheets

INTERCHANGEABLE EXTENSION BOARD DISK ARRAY SYSTEM

BACKGROUND OF THE INVENTION

1. Field of the Invention

The present invention relates to a disk array system used as an external storage device in a computer system and particularly relates to a disk array system in which a switching procedure for selecting a higher-performance disk array mode can be simplified.

2. Description of the Related Art

In a computer system, the opportunity of using a disk array equipment constituted by a plurality of disk devices connected in the form of an array has increased. Such a disk array equipment has been disclosed in JP-A-1-250128 or the like. This equipment has the double features of (1) high speed obtained by the simultaneous multiplex operation of a plurality of disks and (2) high reliability obtained by the existence of redundant disks.

Access control peculiar to the disk array contains: data striping for distributing data into a plurality of disks; parity generation for generating redundant data to be stored in redundant disks; and so on. To perform the access control, various methods have been proposed. The methods are roughly classified into two control methods, that is, one method for performing access control on a host computer in terms of software and the other method using disk array control hardware for performing access control in terms of hardware. In addition, a control method for performing only a part of access control such as parity generation in terms of hardware has been considered as an intermediate control method between the two methods. Software control is generally low in cost but relatively low in performance because of the increase of overhead on the host computer. On the contrary, hardware control is high in cost but is characterized in that relatively high performance can be achieved. Accordingly, by replacing software control with hardware control, an improvement in performance can be achieved at the sacrifice of increase in hardware cost.

Further, methods for connecting the disk devices to the host computer are classified into two types, that is, one type for series-connecting the disk devices onto one disk interface (hereinafter referred to as "IF") line and the other type for parallel-connecting the disk devices to the host computer through IFs separately provided for the respective disk devices. In the comparison between the two types, in the case of series-connection through one line, there arises an advantage in that the host computer requires only one connector, but performance is relatively low because only one cable is used for data transfer. In the case of parallel-connection, the number of connectors required for the host computer increases but performance is improved because the plurality of disks are used independently of each other for data transfer.

Conventionally, in the case where the disk array access control method is required to be switched, if the method for connecting the disk devices to the host computer is required to be switched in accordance with the switching of the disk array access control method, the IF board is exchanged to a new one and at the same time the connection cable is really exchanged to a new one so that the connection method is switched.

In the prior art, there is no consideration about simplification of the procedure for switching the disk array access control mode from a software control mode to a hardware control mode. That is, when, for example, the disk array access control mode is to be switched from a software control mode to a hardware control mode, it is necessary to exchange disk IF boards. There is however no consideration about difference between respective data structures of the disk IF boards depending on the difference between access control modes of the disk array, or the like. Accordingly, when the control mode is to be switched, it is necessary that disks to be used are formatted newly to reconstruct data for the disk devices.

Further, in the case where the access control mode is to be switched, control software such as an operating system and a device driver provided on the host computer must be changed simultaneously with the exchange of the IF board to a new one. Conventionally, it is however necessary that an user instructs the software to set the mode in accordance with the new IF board.

Further, because the IF board is connected to a disk device through a cable, the connection of the cable is required to be altered simultaneously with the exchange of the IF board. Further, in the case where the disk device connection is to be switched from series-connection to parallel-connection, a very troublesome procedure is required for changing the connection of the connection cable.

SUMMARY OF THE INVENTION

An object of the present invention is to provide a disk array system in which the disk array access control mode is switched easily only by the exchange of the IF board so that the procedure of changing the connection of the connection cable with the exchange of the IF board can be eliminated.

Another object of the present invention is to provide a disk array system in which software on a host computer is switched automatically with the exchange of the IF board so that the procedure of switching the disk array control mode to a higher-performance mode can be simplified.

To achieve the foregoing object, the disk array system according to the present invention comprises a host computer, control software on the host computer, a plurality of disk devices arranged in the form of an array, a first board (IF board) for connecting an internal bus of the host computer to the disk devices, and second boards (extension boards) to be connected onto the IF board.

The control software on the host computer switches control automatically in accordance with the disk array access control mode.

The IF board includes an internal bus connector connected to the internal bus of the host computer, an extension board internal bus connector for transferring an internal bus signal with respect to an extension board, and an internal bus controller for disconnecting the internal bus of the host computer from the extension board in terms of a signal. Further, the IF board includes extension board disk IF connectors for performing data transfer between the extension board and the disk IF, and disk device IF connectors which are as many as the extension board disk IF connectors and connected to the extension board IF connectors, respectively. The disk device IF connectors are always connected to disk devices through connection cables. At least the extension board internal bus connector and the extension board disk IF connectors are physically integrated into a single connector so as to be connected to the extension board through the single connector.

As the extension board, several types of extension boards are prepared in accordance with the disk array access control modes. For example, in the case of a software disk array access control mode, the extension board has only one IF controller for switching between internal IF and disk IF to perform data transfer between the IF board and the extension board. In the case of a hardware disk array access control mode, the extension board has control hardware such as a processor and a memory. In this case, the connector between the extension board and the IF board always contains logical connectors of the same number as the number of connectors in the case of parallel connection, regardless of the series- or parallel-connection of the disk devices. Accordingly, the connector between the IF board and the extension board is physically single but logically formed as a set of one internal bus connector and a plurality of disk IF connectors, regardless of the type of the extension board.

Further, the connector between the IF board and the extension board is provided with extension board type identification pins and has means for reporting the type of the extension board identified by the pins to software on the host computer.

The IF board is fixedly connected to the disk devices and, on the other hand, the extension board on the IF board is formed so as to be exchanged to thereby switch the connection of the disk devices automatically.

In the present invention, one and the same disk connection mode can be provided without the change of the connection of the disk devices even in the case where different disk array access control modes are used mixedly, that is, properly speaking, even in the case where different disk device connection modes are used mixedly.

For example, in the case where disk devices are series-connected onto one disk IF line by using a software disk array access control mode, only one IF controller for performing conversion between the internal bus IF and the disk IF is provided as the controller on the extension board. On the extension board, one IF controller and a plurality of extension board disk IF connectors are series-connected, so that a plurality of disk device connectors are logically formed in the portions of the extension board disk IF connectors.

For example, in the case where disk devices are parallel-connected through a plurality of disk IFs by using a hardware disk array access control mode, a plurality of IF controllers and access control hardware are provided as a controller on the extension board. Because the extension board has the plurality of IF controllers, disk device connectors of the same number as in the aforementioned case are logically formed in the portions of the extension board disk IF connectors.

Accordingly, when viewed from the IF board, disk device connectors of the same number are provided regardless of the type of the extension board, so that it becomes unnecessary to exchange connection cables at the time of switching of the disk array access control mode as long as the connectors are logically extended so as to be connected to the disk devices. Here, the type of the extension board identified by extension board type identification pins disposed in the connector between the IF board and the extension board is reported to control software on the host computer, so that the control software switches the control on the host computer automatically in accordance with the disk array access control mode. Although various disk array access control modes can be used, the disk array system can be shifted to a higher performance control system easily only by the exchange of boards when the logical number of disk IF connectors between the IF board and the extension board is always set to a predetermined value.

As described above, according to the present invention, the disk array access control mode and the disk device connection mode can be changed by a very simple procedure of exchanging extension boards without the necessity of altering the connection of the connection cables to the disk devices. Accordingly, a higher performance disk array system can be constructed simply and easily. Further, in the case where the control mode is switched, control software corresponding to a new board provided by exchange can be selected automatically. Accordingly, the user does not need to be aware of the switching of control software. Further, even in the case where the type of the extension board is changed, information of the data structure of the disk array can be reported to the extension board and control software on the host computer. By performing access control on the basis of the information, it becomes unnecessary to reformat disks and reconstruct data. Accordingly, data access can be made by using the control mode of the extension board provided by exchange. After all, switching to a higher-performance disk array system can be made easily and simply without any burden on the user, so that the merit of the present invention for this type disk array system will be large.

DESCRIPTION OF THE PREFERRED EMBODIMENTS

Embodiments of the present invention will be described below with reference to the drawings.

Figure 7:
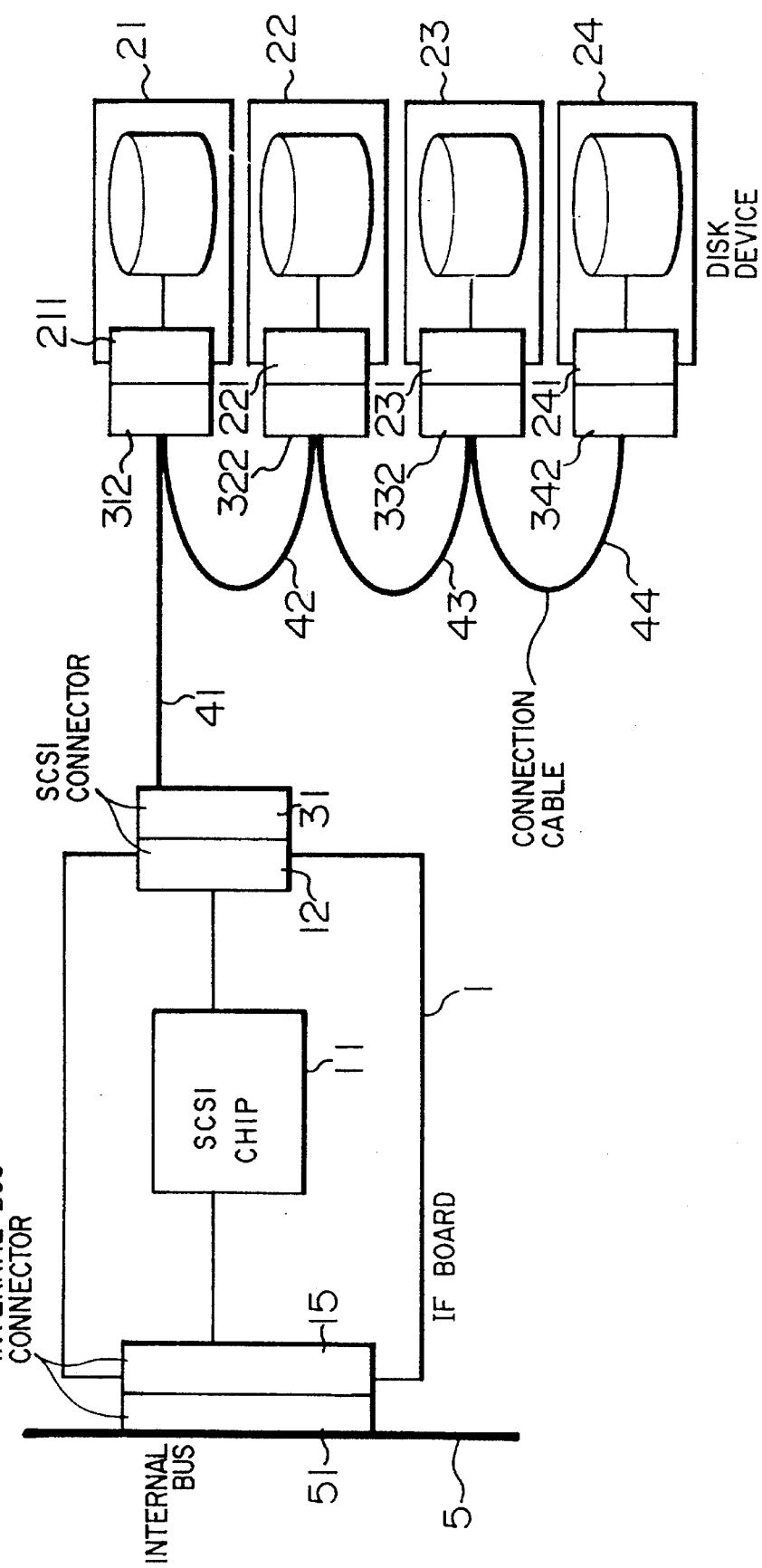
FIG. 7 is a structural diagram of an example of a conventional disk array system.
Figure 8:
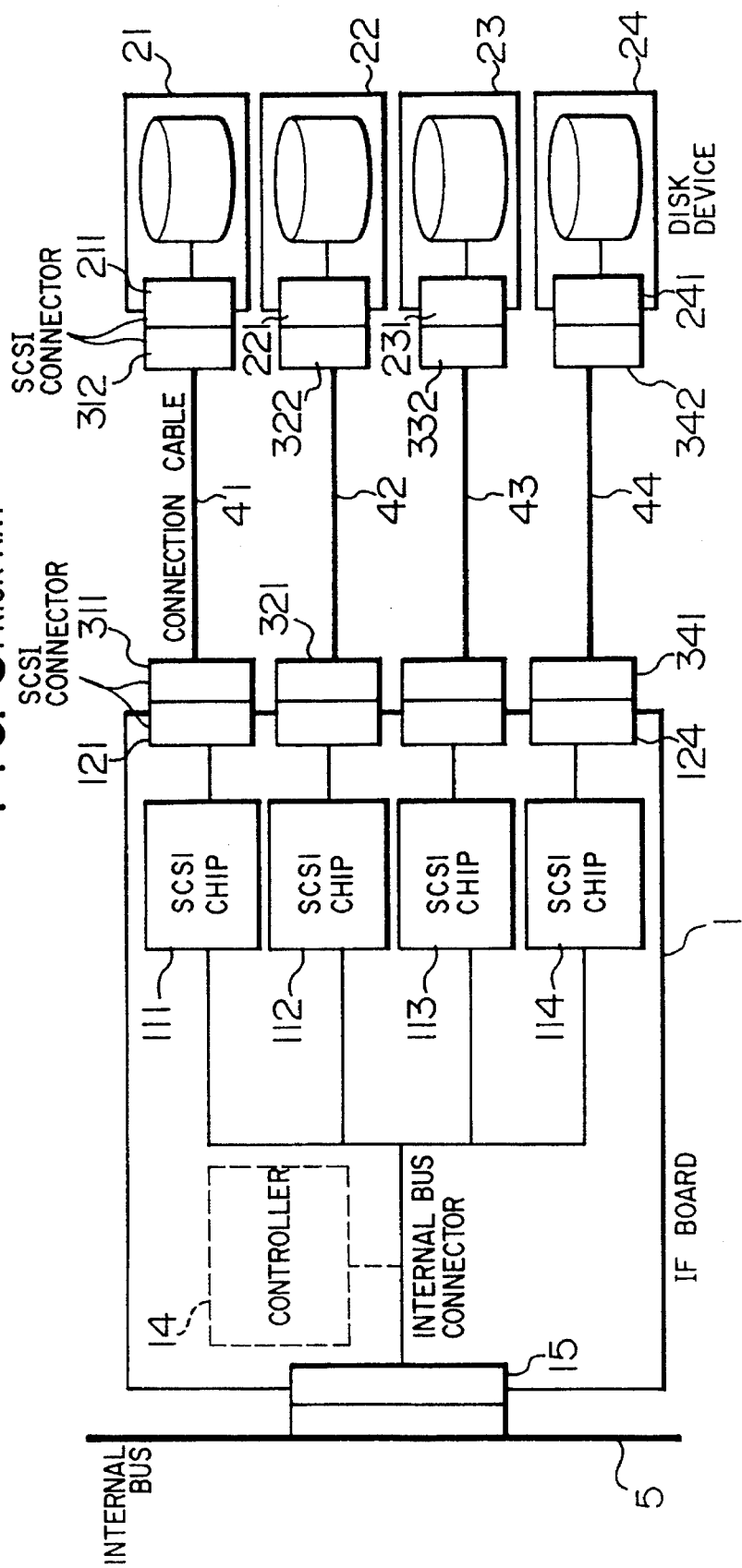
FIG. 8 is a structural diagram of another example of the conventional disk array system.

Referring now to FIGS. 7 and 8, a method of connecting a conventional disk array equipment and a host computer will be described before the description of embodiments of the present invention.

In FIG. 7, an internal bus 5 in the host computer is connected to an IF board 1 through internal bus connectors 51 and 15. For connection of the IF board 1 to a plurality of disk devices 21 to 24, a general disk IF such as an SCSI (Small Computer System Interface) is used. An SCSI chip 11 which is an IF controller disposed on the IF board 1 converts the internal IF into the SCSI, so that the plurality of disk devices 21 to 24 are daisy-chain-connected through SCSI connectors 12, 31, 312 to 342, and 211 to 241 and connection cables 41 to 44. In the case where one disk connector 12 is disposed on the IF board 1 as described above, the situation that the throughput of the IF reaches a limit to form a bottle neck against system throughput will occur frequently when the number of disk devices to be connected increases because only one IF line is used for connection. In order to solve this problem, there is a method using an IF board provided with a plurality of disk connectors. FIG. 8 shows the structure of a conventional disk array system using this method.

In FIG. 8, the IF board 1 has SCSI chips 111 to 114, and disk SCSI connectors 121 to 124 as many as the SCSI chips. The IF board 1 is parallel-connected to disk devices 21 to 24 through the connectors 121 to 124, SCSI connectors 311 to 341, connection cables 41 to 44, SCSI connectors 312 to 342 and SCSI connectors 211 to 241. In this manner, the connection cables 41 to 44 connected to the disk devices individually are connected to the separate SCSI chips 111 to 114, so that the situation that the IF forms a bottle neck seldom occurs. Accordingly, the system throughput can be improved. Further, as represented by the broken-line block in FIG. 8, a controller 14 for performing disk array access control by hardware may be disposed on the IF board 1 so that the IF board 1 can serve as a high-performance IF board in which characteristic overhead caused by disk array control is reduced.

In this manner, IF boards based on various disk array access control modes may be prepared. Conventionally, in the case where the access control mode is to be changed, the connection between the IF board 1 and the disk devices 21 to 24 must be changed simultaneously with the exchange of the IF board 1. Specifically, in order to shift the state of FIG. 7 to the state of FIG. 8, it is necessary to alter the connection of all the daisy-chain-connected connection cables 41 to 44 shown in FIG. 7. That is, it is necessary to alter the connection of the disk devices 21 to 24 so that the disk device are parallel-connected to the IF board 1 shown in FIG. 8 after all the connection cables 41 to 44 are removed. In the case where the plurality of disk devices constituting the disk array equipment are contained in one box, it is therefore necessary that the connection of the cables is corrected in the box in order to change the connection between the disk devices. Accordingly, a troublesome procedure for switching the access control mode is required. Further, if the access control mode of the disk array in which data has been already stored is changed, the IF board and the control software on the host computer after the change of the mode cannot recognize the structure of data in the disk devices. It is therefore necessary that the disks are formatted newly to reconstruct the structure of data, and hence conventional data cannot be used.

Figure 1:
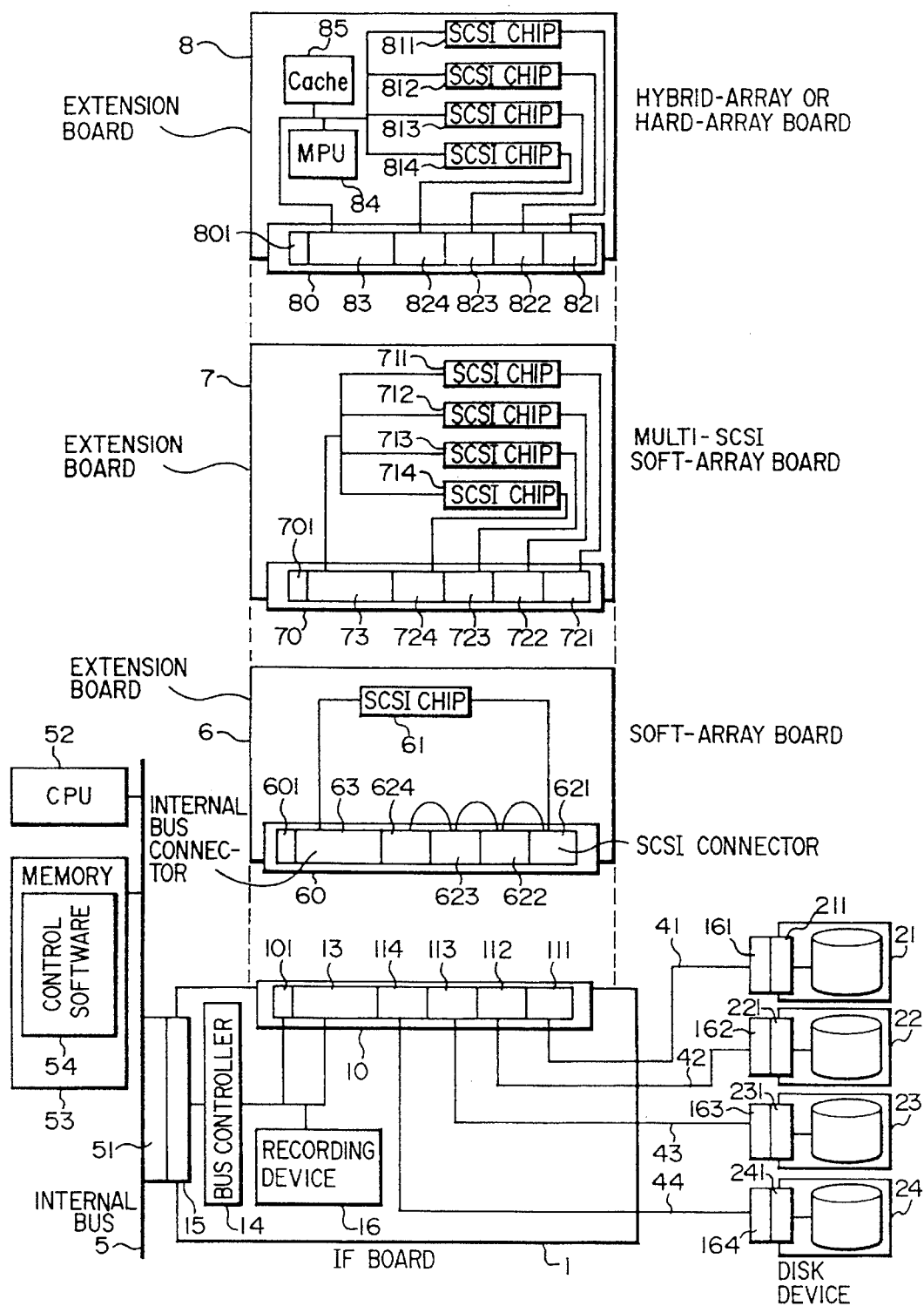
FIG. 1 is a structural diagram of a disk array system according to an embodiment of the present invention.

Referring to FIGS. 1 through 4, an embodiment of the present invention will be described below. FIG. 1 is a structural diagram of a disk array system as an embodiment of the present invention.

In FIG. 1, the reference numeral 1 designates an IF board, 5 an internal bus in a host computer, 6, 7 and 8 extension boards and 21, 22, 23 and 24 disk devices. The IF board 1 is connected to the internal bus 5 through internal bus connectors 51 and 15. A CPU 52 and a memory 53 in the host computer are connected to the internal bus 5. Control software 54 such as an OS and a device driver is loaded on the memory 53. A bus controller 14 connected to the internal bus connector 15, an extension board internal bus connector 13 connected to the bus controller 14 and a recording means 16 connected to the bus controller 14 for recording the data structure of the disk array are provided on the IF board 1. The host computer side internal bus 5 is disconnected from the extension board by the internal bus controller 14 in terms of a signal. Accordingly, there are no problems of shortage of bus length caused by the wiring of the internal bus line, and so on. The recording means 16 is constituted by a nonvolatile RAM or the like. The data structure of the disk array, such as disk array level, striping size, parity data storage address, and so on, is recorded by the recording means 16.

The disk devices 21 to 24 constituting the disk array (disk array equipment) are fixedly connected to SCSI connectors 111 to 114 on the IF board 1 through SCSI connectors 211 to 241, SCSI connectors 161 to 164 and connection lines 41 to 44, respectively. The present invention is configured so that it is unnecessary to change the connection between the IF board 1 and the disk devices 21 to 24 even in the case where the connection of the disk devices 21 to 24 is changed from series-connection to parallel-connection. Accordingly, there is a feature that it is not necessary for the user to be aware of the connection mode of the disk devices and to change the connection. In the case where the disk devices 21 to 24 are provided in the form of a box separated from the host computer, the connection lines 41 to 44 are constituted by general connection cables. The disk devices 21 to 24 may be provided as individual boxes or may be united into one box. The SCSI connectors 161 to 164 may be mounted onto the IF board 1 or may be mounted directly onto the host computer. In the case where the host computer and the disk devices 21 to 24 are provided in one and the same box of a server type, the connection lines 41 to 44 may be provided not as cables but as signal lines.

The IF board 1 further has a connector 10 for connection with the extension boards 6, 7 and 8. The connector 10 is constituted by an internal bus connector 13, SCSI connectors 111 to 114 and an extension board type identification means 101. In the embodiment shown in FIG. 1, the SCSI connectors 111 to 114 are formed by physically uniting extension board SCSI connectors with disk device SCSI connectors, respectively.

In the following, the subject of the description will be shifted to the extension boards 6, 7 and 8. The extension boards 6, 7 and 8 are boards of the same connector shape to be connected onto the IF board 1.

The extension board 6 is used in the case of a software disk array control (hereinafter referred to as "soft-array") mode. A connector 60 of the extension board 6 used for connection to the IF board 1 is constituted by SCSI connectors 621 to 624, an internal bus connector 63 and an extension board type identification means 601. On the extension board (soft-array board) 6, the internal bus connector 63 is connected to an SCSI chip 61 which is daisy-chain-connected to the SCSI connectors 621 to 624. It is now important that the number of SCSI connectors in the extension board 6 is set to be the same as the number of SCSI connectors in each of the extension boards 7 and 8. Although FIG. 1 shows the case where the number of SCSI connectors is 4, it is a matter of course that the number of SCSI connectors is not limited to 4 and that the number of SCSI connectors can be set to an arbitrary value as long as the number of SCSI connectors is equal to the number of SCSI connectors in each of the extension boards 7 and 8. In the case where the extension board 6 is used, the access control of the disk array equipment is carried out by control software 54 on the host computer.

The extension board 7 is used in the case of the aforementioned soft-array mode and in the case where the disk devices are parallel-connected. The extension board 7 is a board (multi-SCSI soft-array board) having a plurality of SCSI chips 711 to 714. A connector 70 of the extension board 7 used for connection to the IF board 1 is constituted by SCSI connectors 721 to 724, an internal bus connector 73 and an extension board type identification means 701. On the extension board (soft-array board) 7, the internal bus connector 73 is connected to the SCSI chips 711 to 714 which are connected to the corresponding SCSI connectors 721 to 724 individually. Also in the case where the extension board 7 is used, the access control of the disk array equipment is carried out by control software 54 on the host computer.

The extension board 8 is used in the case of a hardware disk array access control (hereinafter referred to as "hard-array") mode. Therefore, an MPU 84 for performing control such as data striping and parity generation, a cache 85 necessary for the control and a plurality of SCSI chips 811 to 814 are provided on the extension board (hard-array board) 8. A connector 80 of the extension board 8 used for connection to the IF board 1 is constituted by SCSI connectors 821 to 824, an internal bus connector 83 and an extension board type identification means 801. On the extension board 8, the MPU 84, the cache 85 and the SCSI chips 811 to 814 are connected to the internal bus connector 83 and, further, the SCSI chips 811 to 814 are connected to the corresponding SCSI connectors 821 to 824 individually. In the case where the extension board 8 is used, the access control of the disk array equipment is carried out by the MPU 84 on the extension board 8. Although the above description has been made upon the case where access control such as data striping and parity generation is carried out by the MPU 84 on the extension board 8, it is a matter of course that the MPU 84 does not need to carry out all access control and that the access control may be allocated to software and hardware (hybrid-array board) so that parity generation is carried out on the extension board 8 but data striping is carried out by control software 54 on the host computer.

Why several types of extension boards are prepared as described above is as follows. The processing speed is generally improved when a multi-IF (multi-SCSI) structure is provided or when processing is performed by hardware. In the case where a higher-performance disk array system is required, a soft-array mode may be switched to a multi-IF soft-array mode, a hybrid-array mode or a hard-array mode. In this manner, the access control mode of the disk array equipment is changed by the exchange of the extension board. Because the disk devices 21 to 24 are now kept to be connected to the IF board 1, the user does not need to be aware of the connection mode of the disk devices. It is a matter of course that the types of the extension boards are not limited to the aforementioned three types and that another type extension board may be formed by using the access control mode of the disk array equipment and the connection mode of the disk devices in combination. For example, a disk series-connection extension board for performing disk array access control by hardware may be considered.

In the present invention, one and the same IF board 1 is always used regardless of the disk array access control mode, so that data structure information recorded by the recording means 16 in the IF board 1 can be referred to even in the case where the extension boards 6, 7 and 8 are exchanged. Accordingly, even in the case where the type of the extension board is changed, data structure information in the disk array can be reported to the extension board and control software on the host computer. By performing access control on the basis of the information, the necessity of re-formatting the disks and reconstructing data is removed so that data access can be made by using the control mode of the extension board provided by the exchange.

Although the above description has been made upon the case where the bus controller 14 of the IF board 1 functions as a so-called buffer without signal-form conversion, it is a matter of course that the invention is not limited to the specific embodiment and that the invention can be applied to the case where a different IF is used for data transfer between the IF board 1 and the extension boards 6, 7 and 8. That is, the bus controller 14 shown in FIG. 1 may be formed as an IF converter for conversion to an original IF, and the connector 13 may be formed as a connector for the original IF thus subjected to conversion. Further, the type of the internal bus, for example, specification difference such as EISA (Enhanced Industry Standard Architecture), MCA (Micro Channel Architecture), PCI (peripheral Connect Interface), and so on, may be absorbed by the aforementioned IF converter so that data transfer with respect to the respective extension boards can be performed by one and the same IF. In the aforementioned configuration, one and the same means can be used as the IF control means or the disk array control means on the extension boards 6, 7 and 8 regardless of the type of the internal bus. Accordingly, if IF boards are prepared in accordance with the type of the internal bus, the control portion on the extension board does not need to be designed/produced newly so that development/producing cost can be reduced compared with the case where boards are produced individually in accordance with different internal bus specifications.

Figure 2:
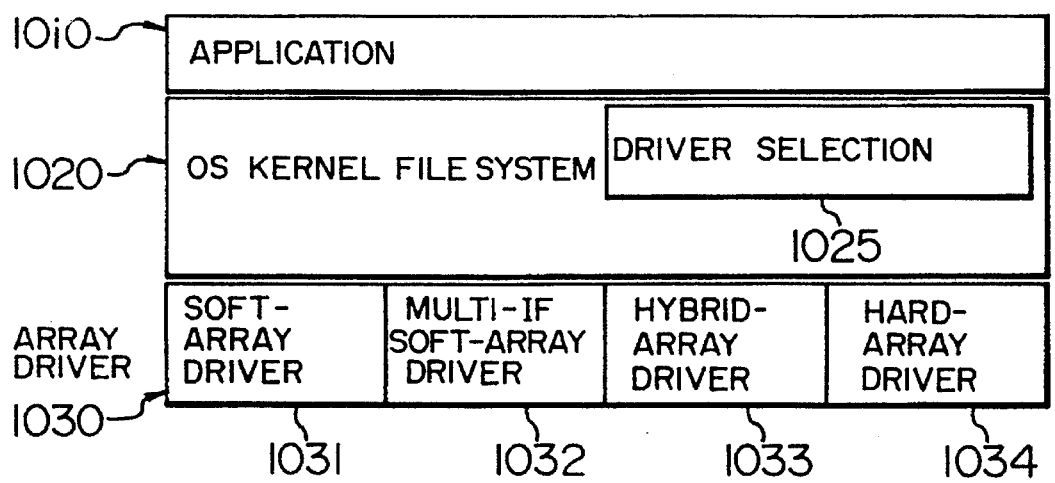
FIG. 2 is an explanatory view showing an example of the structure of control software used in the embodiment of the present invention.

In the case where the access control mode of the disk array equipment is to be switched, the control software on the host computer must be changed simultaneously with the exchange of the extension board. Referring to FIG. 2, the structure and operation of the control software will be described below.

FIG. 2 shows the structure of software on the memory in the host computer in this embodiment. An application 1010 is placed in a highest rank and performs direct IF with respect to the user. An OS Kernel file system 1020 is placed under the application 1010 in rank and controls a filesystem. An array driver 1030 is placed under the OS Kernel file system 1020 and makes direct access to the disk devices. When a disk access request is generated, the application 1010 issues a system call to the OS Kernel file system 1020. The same access request as that to a general single disk is issued from the OS Kernel file system 1020 to the device driver. As a result, the array driver 1030 converts the request issued from the OS Kernel file system 1020 into requests to be given to disk devices and issues the access requests to the disk devices used really. Therefore, the array driver 1030 is constituted by disk array access procedures and device drivers. A soft-array driver 1031, a multi-IF soft-array driver 1032, a hybrid-array driver 1033, a hard-array driver 1034, and so on, are prepared in accordance with the control mode. When the type of the extension board identified by the extension board type identification means is reported to a driver selection portion 1025 of the OS Kernel file system 1020, the driver selection portion 1025 selects a driver corresponding to the board type from the array drivers 1031 to 1034. All the array drivers do not need to be loaded on the memory. For example, a driver corresponding to the type of the extension board used currently may be selectively loaded on the memory. In this case, it is necessary that the corresponding array driver is loaded on the memory simultaneously with the exchange of the extension board.

Figure 3:
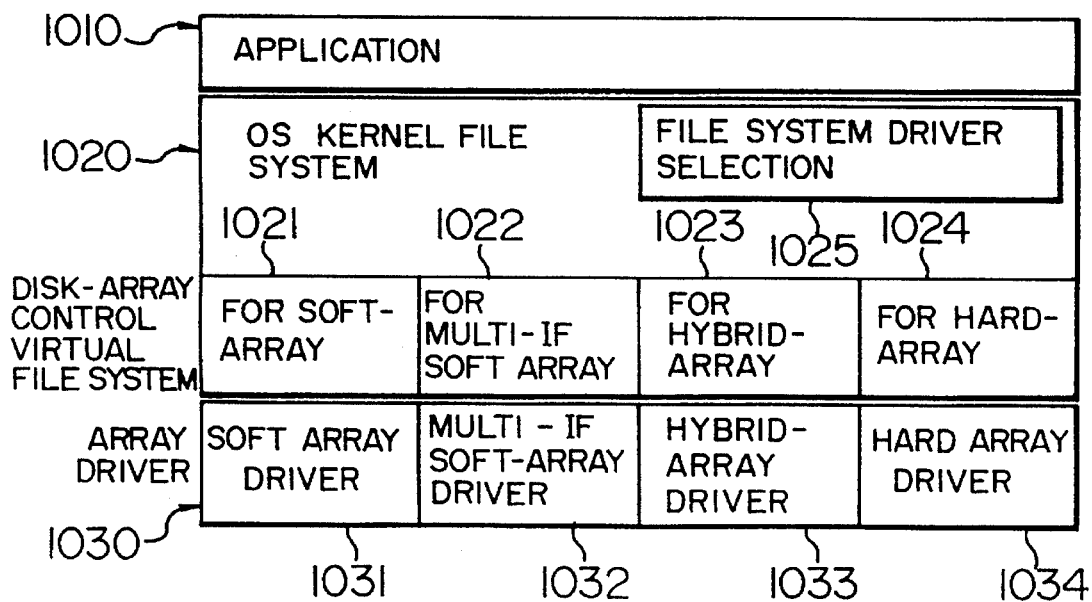
FIG. 3 is an explanatory view showing another example of the structure of control software used in the embodiment of the present invention.

A structure shown in FIG. 3 may be considered as the software structure on the host computer side memory. Although FIG. 2 shows the case where the OS Kernel file system is not changed at all, FIG. 3 shows the case where the OS Kernel file system 1020 contains disk array virtual file systems 1021 to 1024. As a result, in this case, the recognition of disk devices seen from the OS Kernel file system 1020 is different so that the OS Kernel file system 1020 performs the access control of the disk array while recognizing the disk array as a set of disk devices. The case of FIG. 3 is substantial equal to the case of FIG. 2, except the case of FIG. 3 is different from the case of FIG. 2 in the software level in which the access control of the disk array is performed. That is, in the case of FIG. 3, the type of the extension board identified by the extension board type identification means is reported to the driver selection portion 1025 of the OS Kernel file system 1020 and then the driver selection portion 1025 selects a driver corresponding to the type of the board from the array drivers 1031 to 1034 in the same manner as in the case of FIG. 2.

Figure 4:
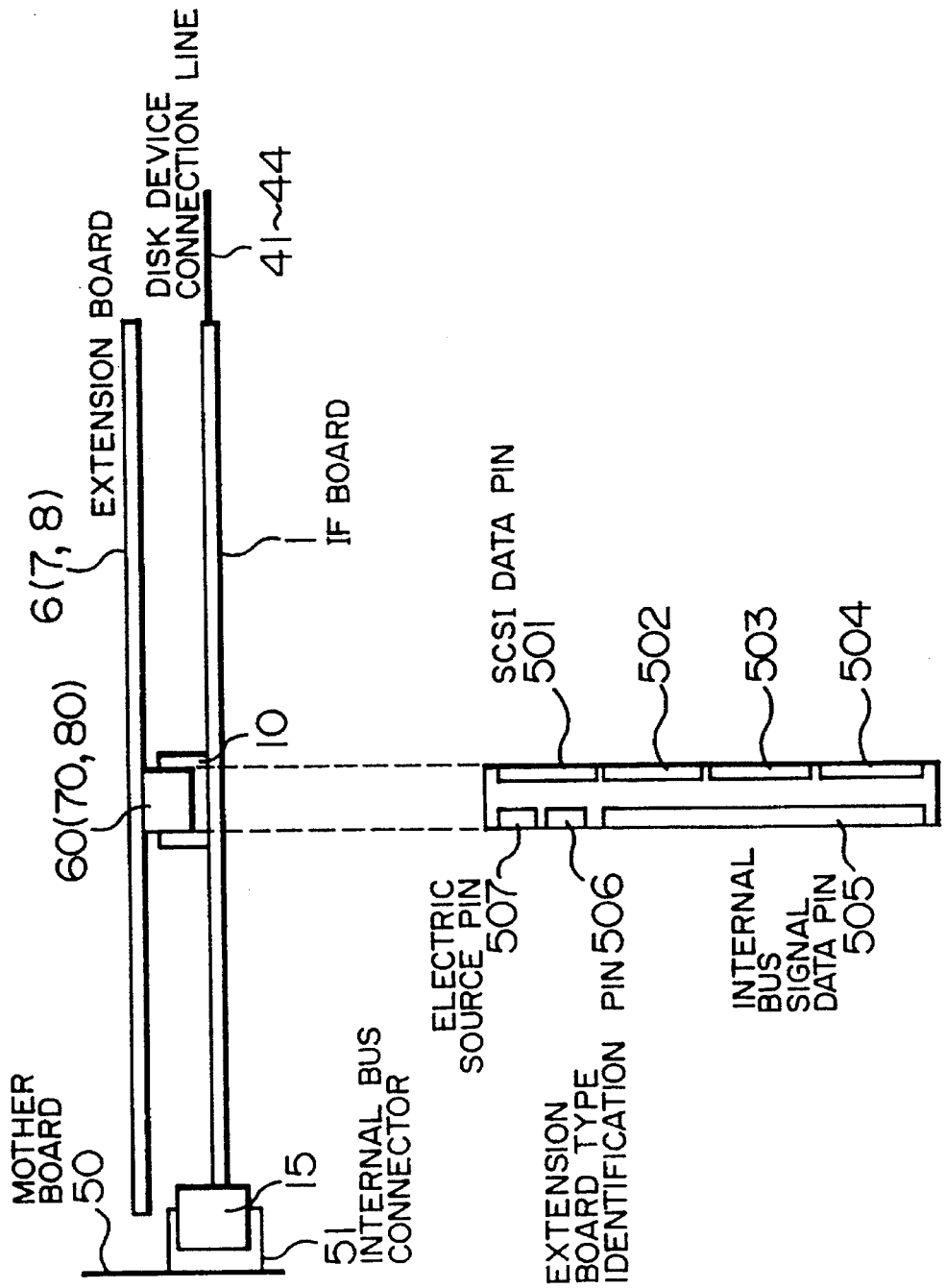
FIG. 4 is an explanatory view showing an example of the arrangement of pins in a connector between an IF board and an extension board in the embodiment of the present invention.

Referring to FIG. 4, an example of the connector for connecting the IF board and the extension board 6 (7 or 8) in this embodiment will be described below. The IF board 1 is connected to an internal bus 5 of a mother board 50 through internal bus connectors 51 and 15 and has connection lines 41 to 44 with respect to disk devices 21 to 24. The internal bus connectors 51 and 15 are defined on the basis of the internal bus specification. The IF board 1 is of a standard board size. A connector 10 for an extension board is disposed in the center portion of the IF board 1, so that the extension board is connected through a connector 60 (70 or 80) so as to be parallel to the IF board 1. By arranging the IF board 1 and the extension board so as to be parallel to each other, interference of the extension board with an adjacent extension board connected thereto can be prevented so that the occupied space can be reduced.

The arrangement of connector pins in the connectors 10 and 60 (70 or 80) will be described below. The connector is constituted by SCSI data pins 501 to 504, internal bus signal data pins 505, extension board type identification pins 506 and electric source pins 507. When, for example, three pins are prepared as the extension board type identification pins 506 so as to be electrically connected in an L or H level on the extension board, extension boards corresponding to three bits, that is, eight types of extension boards can be identified. The type of the board thus identified is reported to the control software on the host computer, so that the control software is switched automatically as described above. Accordingly, the user does not need to be aware of the switching of the software.

Figure 5:
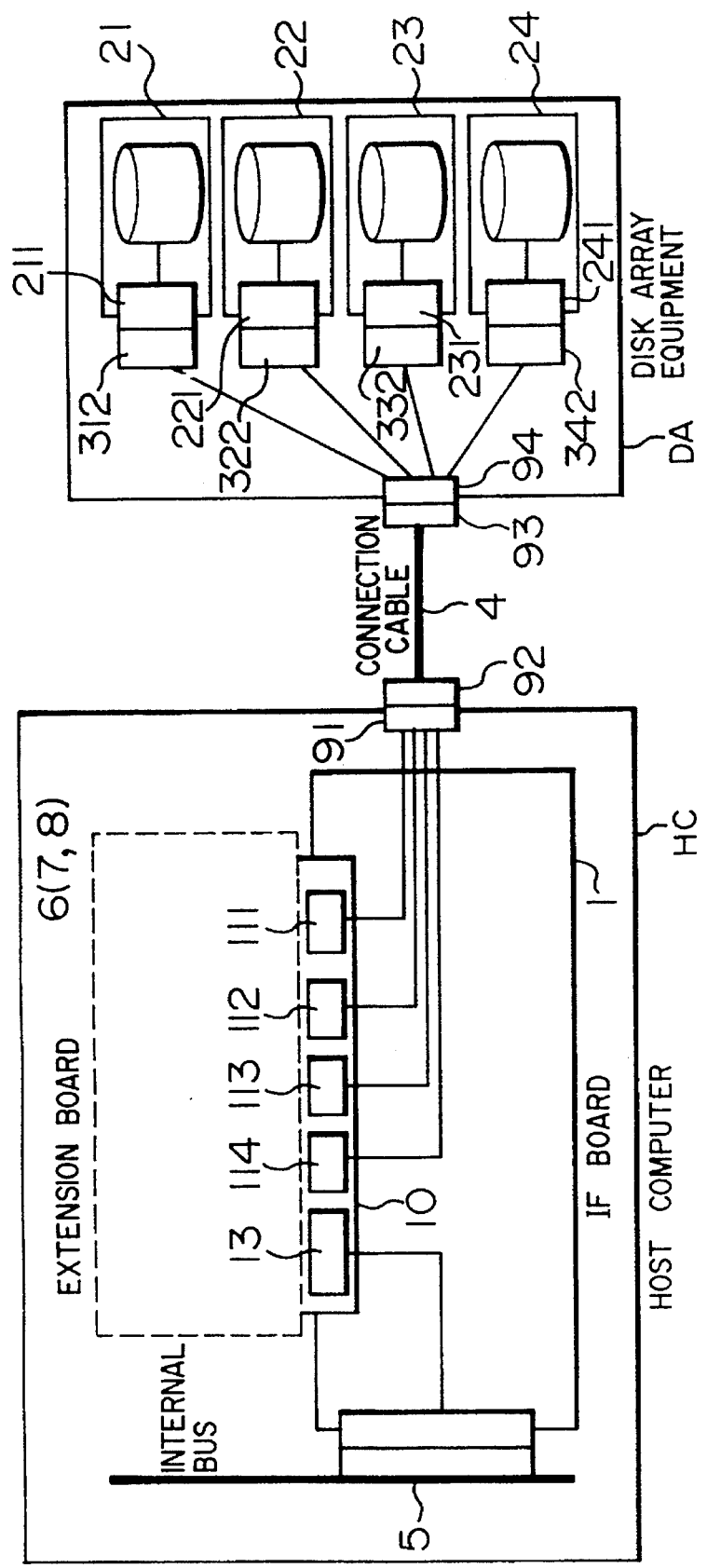
FIG. 5 is a structural diagram of the disk array system according to another embodiment of the present invention.

Referring to FIG. 5, another embodiment of the present invention will be described below. From the point of view of the mounting of the IF board 1 onto the host computer HC, the size of the board connected to the internal bus 5 is determined on the basis of the standard, so that it may be difficult to mount a necessary number of SCSI connectors onto the IF board 1. In this embodiment, therefore, respective disk device SCSI connector portions of SCSI connectors 111 to 114 of the IF board 1 are integrated into a single connector 91 and, further, connection cables are physically integrated into one connection cable so that the IF board 1 is connected to the disk array equipment DA through integrated connectors 91 to 94. The shape of the connector 10 for the extension board 6 (7 or 8) is the same as in the embodiment shown in FIG. 1. In the inside of the disk array equipment DA, the connector 94 is connected to respective disk devices 21 to 24 through connectors 312 to 342 and connectors 211 to 241. That is, in this embodiment, there is no necessity of changing the connection between the IF board 1 and the respective disk, so that the cables can be integrated into one cable. Accordingly, disk device SCSI connectors can be easily mounted onto the board. Furthermore, wiring can be simplified because the number of cables is set to one.

Figure 6:
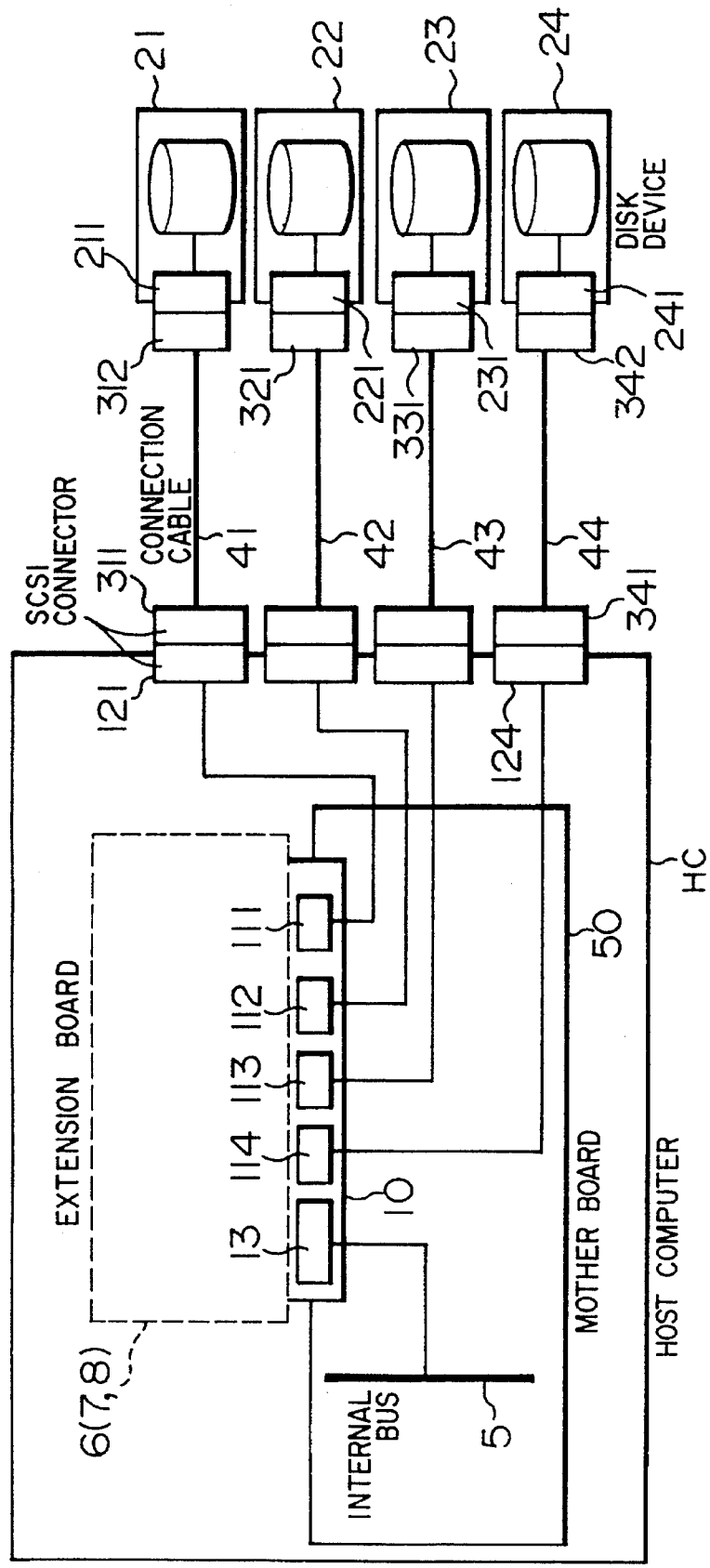
FIG. 6 is a structural diagram of the disk array system according to a further embodiment of the present invention.

Referring to FIG. 6, a further embodiment of the present invention will be described below. In this embodiment, the IF board always connected to the mother board of the host computer HC in the previous embodiment is united with the mother board 50 to thereby remove the internal bus connectors 51 and 15 shown in FIG. 1 so that the connector 10 containing SCSI connectors 111 to 114 shown in FIG. 1 is directly mounted onto the mother board 50. In this embodiment, the extension board is directly connected to the internal bus 5 of the host computer through the internal bus connector 13. In this embodiment thus configured, the SCSI connectors 111 to 114 are disposed in the mother board 50, so that the limitation in the number of connectors caused by the limitation in the size of the board can be eliminated. Further, the internal bus connectors of the mother board 50 can be omitted, so that the number of parts and the mounting space can be reduced. Also in this embodiment, the feature that the access control of the disk array can be changed easily by the exchange of the extension board can be achieved without any change.

Although the aforementioned embodiments have shown the case where SCSI is used as a disk IF, it is a matter of course that the present invention is not limited thereto and that the subject of the invention can be achieved by replacing the SCSI chips and SCSI connectors with other disk IF control means and connectors even in the case where any disk IF is used.

What is claimed is:

1. A disk array system used as an external storage device in a computer system, said disk array system comprising a host computer, a disk access control arrangement disposed on said host computer, disk array equipment constituted by n (n is an integer of at least 2) disk devices arranged in an array, a first board operatively associated with an internal bus of said host computer for connecting said n disk devices to said internal bus, and alternatively selectable plural types of second boards to be operatively connected to said first board through a single connector, wherein:

said disk access control arrangement disposed on said host computer has a control mode selectively switchable among a plurality of disk access control modes;

said first board is fixedly connected to said n disk devices through n signal lines;

said plural types of second boards include a board having an interface control arrangement which is series-connected to n disk interface connectors, a board having an n interface control arrangement which is parallel-connected to n disk interface connectors, and a board having a disk access controller and an n interface control arrangement which is parallel-connected to n disk interface connectors, at least one of said second boards being detachably connected to said first board; and said single connector between said first board and said selected second board includes a connector for said internal bus, said n disk interface connectors, and a second board type identifying means, the number n of said disk interface connectors being set to a common constant value regardless of the type of said selected second board, so that the type of said selected second board identified by said second board type identifying means is reported to said disk access control arrangement disposed on said host computer to thereby select a disk array access control mode automatically in accordance with the type of said second board.

2. A disk array system according to claim 1, wherein a board of the type allowing said host computer to perform all disk array access control and another board of the type allowing exclusive hardware to perform at least part of the disk array access control to be executed on said host computer are configured as types of second boards, and a required one of the disk array access control modes is automatically selected in response to change-over between the configured types of second boards.

3. A disk array system according to claim 1, wherein said n disk interface connectors are integrated into one connector, and a connection line formed by collecting n connection lines is operatively associated with said integrated connector so that the data is transferred through said integrated connector to said disk array equipment constituted by said n disk devices.

4. A disk array system according to claim 1, wherein said n signal lines extend from said first board; and the n disk interface connectors are disposed directly in said host computer so as to be fixedly connected to n disk devices.

5. A disk array system according to claim 1, wherein said first board is associated with a mother board of the host computer so that said second boards can be connected selectively to said mother board.

6. A disk array system according to claim 1, wherein an interface converter is disposed on said first board which is connected to one of said second boards through an original interface converted from the interface converter; and said original interface is configured so that said one second board can be used regardless of internal bus specification.

7. A disk array system according to claim 1, wherein means for recording data structure of the disk array equipment is disposed on said first board; and said data structure before the exchange of one of said second boards to a new one is reported to a controller of the host computer and said new second board at the time of the exchange of the second board so that access can be made by using the control mode of the new second board without reconstruction of data before the exchange of the second board.

8. A disk array system according to claim 1, wherein said second board type identification means disposed in the single connector between said first board and one of said second boards is constituted by a plurality of identification contacts so that the type of said second board is identified by combination of on/off states of said identification contacts.

* * * * *